US012587366B2

(12) United States Patent
Cain et al.

(10) Patent No.: US 12,587,366 B2
(45) Date of Patent: Mar. 24, 2026

(54) SYSTEM AND METHOD FOR GENERATING CRYPTOGRAPHIC SIGNATURE FOR ARTIFICIAL INTELLIGENT GENERATED CONTENT

(71) Applicant: Salesforce, Inc., San Francisco, CA (US)

(72) Inventors: Michael Cain, Austin, TX (US); Richard Perry Pack, III, San Francisco, CA (US); Andrew Howe, San Francisco, CA (US); Thomas Jones, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 135 days.

(21) Appl. No.: 18/427,415

(22) Filed: Jan. 30, 2024

(65) Prior Publication Data

US 2025/0247213 A1 Jul. 31, 2025

(51) Int. Cl.
| | |
|---|---|
| *H04L 9/32* | (2006.01) |
| *H04L 9/08* | (2006.01) |

(52) U.S. Cl.
CPC .......... *H04L 9/0825* (2013.01); *H04L 9/3236* (2013.01)

(58) Field of Classification Search
CPC ........................... H04L 9/0825; H04L 9/3236
See application file for complete search history.

(56) References Cited

U.S. PATENT DOCUMENTS

2023/0370274 A1* 11/2023 Chen ..................... H04L 9/0825

* cited by examiner

*Primary Examiner* — Hany S. Gadalla
(74) *Attorney, Agent, or Firm* — Haynes and Boone, LLP

(57) ABSTRACT

Embodiments described herein provide a method for content transmission using a cryptographic signature. The method includes: generating, by a neural network model employing a plurality of state parameters and implemented on one or more processors, an output content; generating a string of Hash values based on the output content; creating a cryptographic signature by encrypting the string of Hash values and one or more state parameters of the neural network model using a private key; embedding the cryptographic signature in the output content; and transmitting, via a communication interface, the output content embedded with the cryptographic signature to a destination server.

20 Claims, 9 Drawing Sheets

System 116

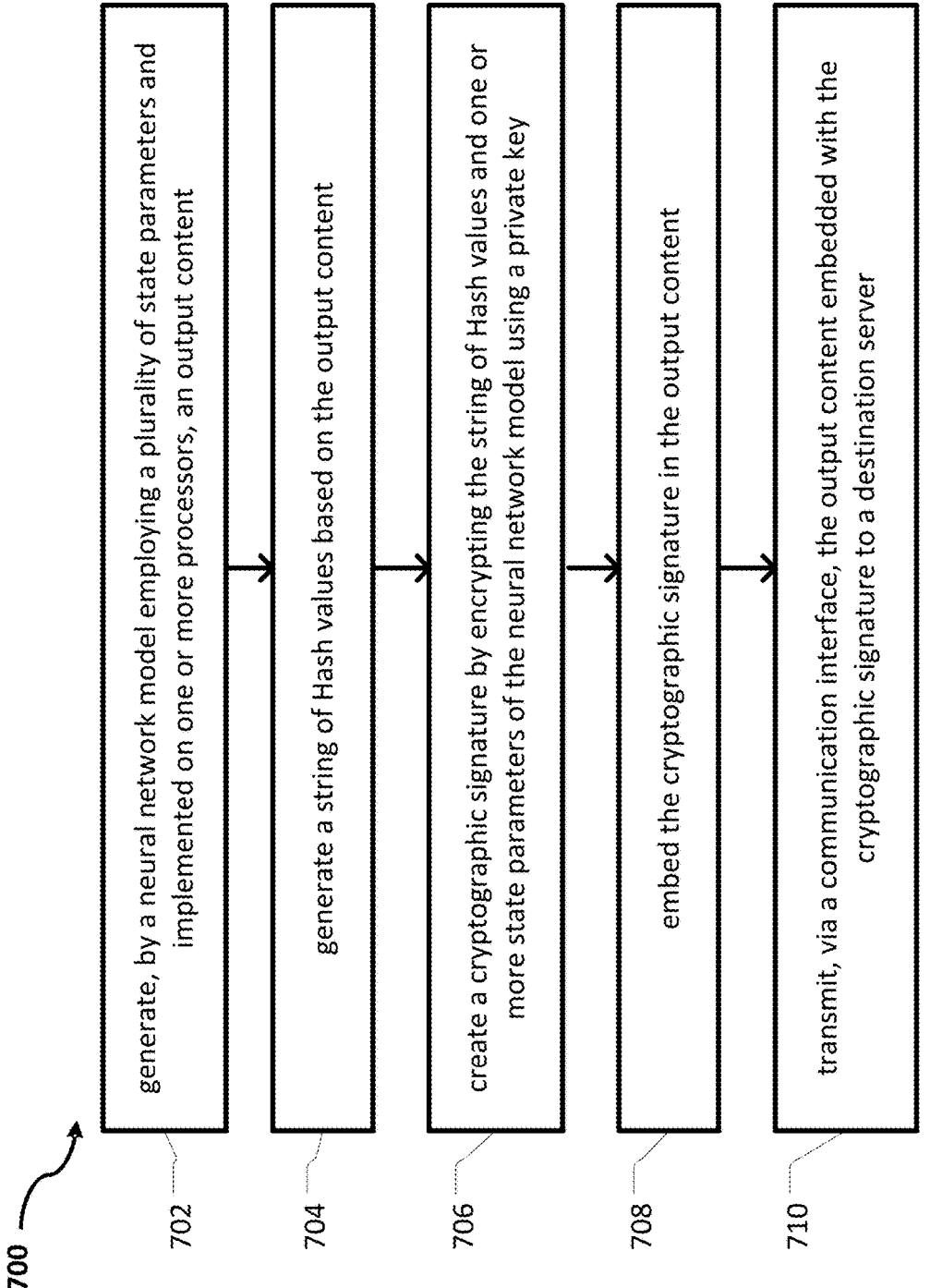

702 — generate, by a neural network model employing a plurality of state parameters and implemented on one or more processors, an output content 704 — generate a string of Hash values based on the output content 706 — create a cryptographic signature by encrypting the string of Hash values and one or more state parameters of the neural network model using a private key 708 — embed the cryptographic signature in the output content 710 — transmit, via a communication interface, the output content embedded with the cryptographic signature to a destination server

SYSTEM AND METHOD FOR GENERATING CRYPTOGRAPHIC SIGNATURE FOR ARTIFICIAL INTELLIGENT GENERATED CONTENT

TECHNICAL FIELD

The present disclosure generally relates to machine learning models for generating cryptographic signatures, and more specifically, to systems and methods for generating cryptographic signature for artificial intelligent (AI) generated content.

BACKGROUND

Existing generative AI models have been used widely in applications such as text generation, image generation, speech and audio generation, video generation, etc. In a multi-tenant cloud-based computing environment, when an AI model communicates with another AI model using AI-generated content without human intervention, it can be difficult to ensure the integrity and authenticity of the content. For example, the AI-generated content may contain errors or unauthorized manipulations. Such errors and/or unauthorized manipulations may propagate along different AI models to further create content that can be inaccurate, toxic, offensive, and/or the like.

BRIEF DESCRIPTION OF THE DRAWINGS

FIG. 7 is an example logic flow diagram illustrating a method of AI agents generating cryptographic signature for AI-generated content based on the system shown in FIGS. 3A, 3B, 4, 5A, 5B, and 6, according to some embodiments.

Figure 1:
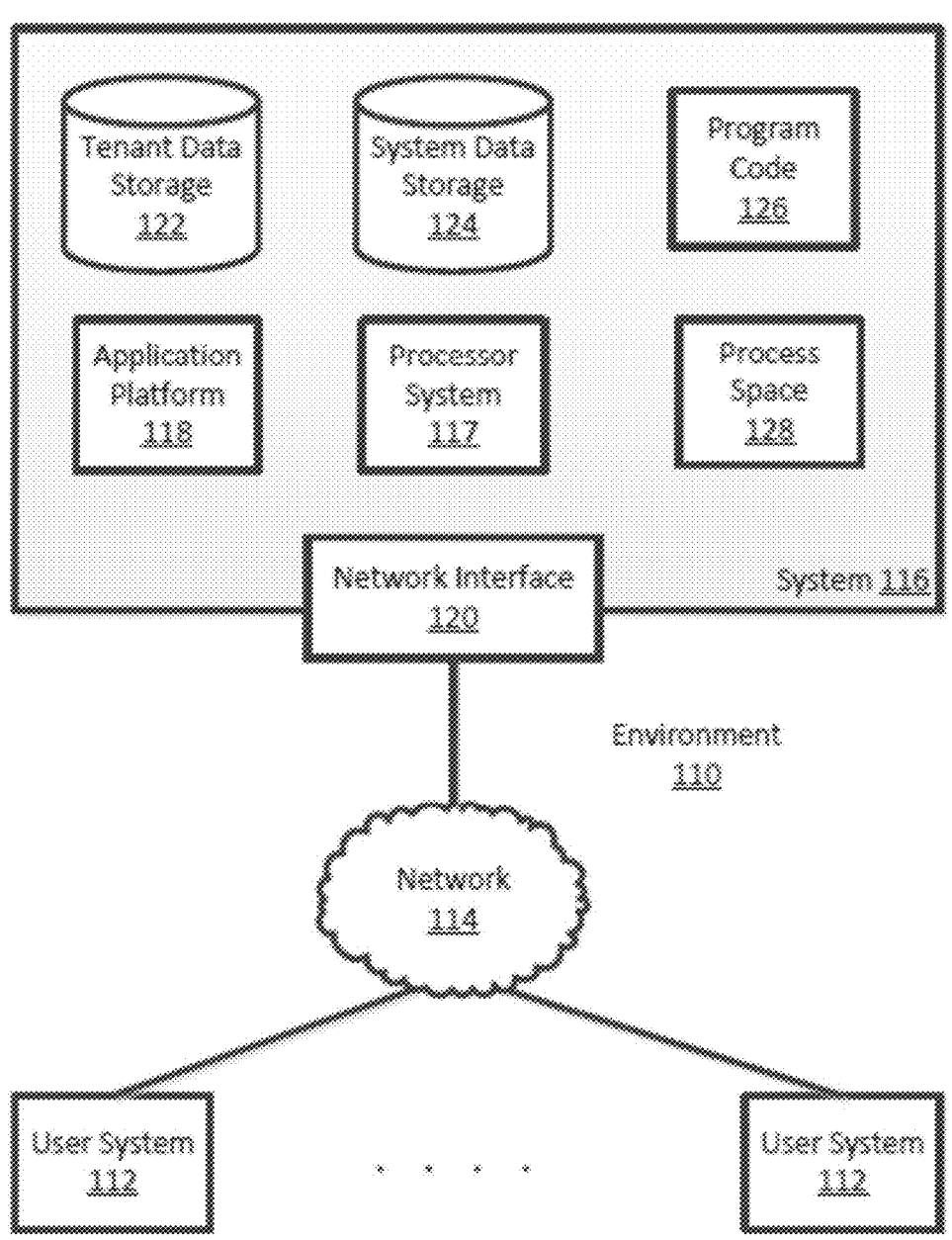
FIG. 1 illustrates a block diagram of an example environment where the system and methods for an AI agent may be provided and used, according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented on one or more neural networks.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters.

Overview

In view of the need to control content hallucination in a multi-tenant cloud-based computing environment involving the use of AI models (such as LLMs), embodiments provide a generative AI system that uses a cryptographic signature for AI-generated content in a multi-tenant cloud-based computing environment to validate AI-generated content and identify the originator of such content, thus to improve the integrity and authenticity in communication. Specifically, a sender agent which may be an AI model, may generate a cryptographic signature based on specific characteristics of the AI model associated with generating particular content and embed it into its generated content before transmitting the content. In this way, the cryptographic signature may be used by any receipt of such AI-generated content to validate, identify and/or trace the originator of the content.

In one embodiment, the sender agent may generate the cryptographic signature by first generating a Hash using the content, and then encrypting the Hash and the parameters of the AI model using a private key. A recipient agent may receive AI-generated content with a cryptographic signature, and decrypt the content using a public key. The recipient agent may then validate the received AI-generated content by comparing the decrypted Hash with a newly generated Hash using the AI-generated content.

In one embodiment, the cryptographic signature embedded in the AI-generated content may contain identifying information of the particular AI model that originates the content. The recipient agent may thus identify the sender agent from the decrypted signature.

In this way, the encryption system provides a secured mechanism for model-to-model communication in a multi-tenant cloud-based computing environment. AI-content is traceable to identify and alert for any unwanted information, improving the integrity and authenticity in agent-to-agent communication. Therefore, secured communication technology in an AI environment is improved.

Example Multi-Tenant Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users. In some embodiments, the multi-tenant architecture may employ cryptographic signature in communication between tenants (e.g., agents), as discussed herein.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. In some implementations, the on-demand database service may include operations on a relational database. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes. In some embodiments, system data 125 includes one or more pairs of private-public keys used by agents to generate cryptographic signatures. In some embodiments, a public key pairs with more than one private keys.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented data base management system (OODBMS) or relational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
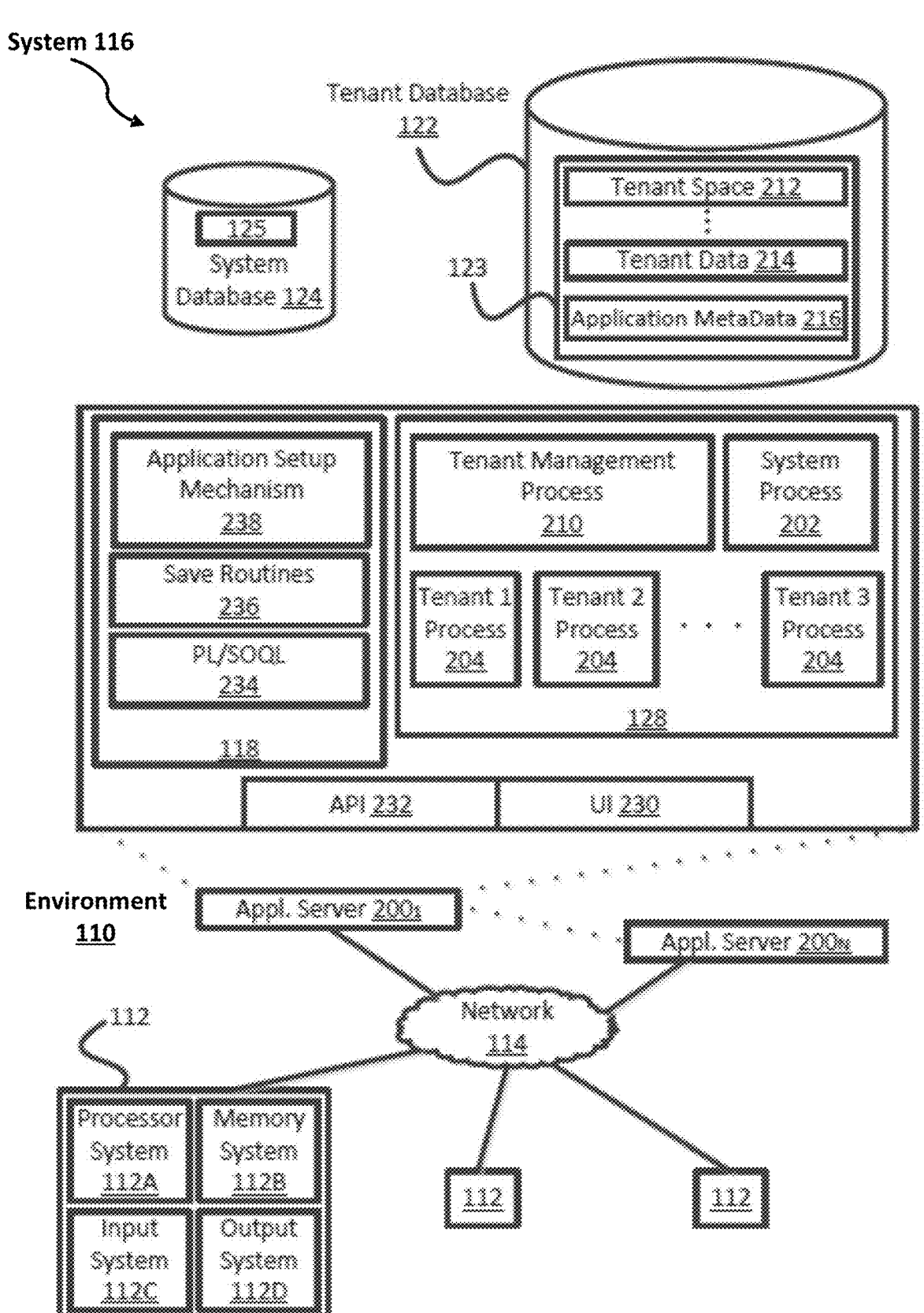
FIG. 2 illustrates a block diagram of another example environment where the system and methods for an AI agent may be provided and used, according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers 200₁-200_N, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server 200₁ might be coupled via the network 114 (e.g., the Internet), another application server 200_{N-1} might be coupled via a direct network link, and another application server 200_N might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses at least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing an object localization framework that utilizes a pipeline of algorithmic approaches, machine learning processes, and/or neural networks to locate and classify objects in images, the CRM database may include one or more tables representing unannotated image data and resulting annotated image data. The annotated image data may include customer results from the unannotated image data and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users") regarding object localization in image data. To facilitate interaction between the database system 116 and the user, a search bar, voice interface, data upload process, or similar user interface tool is provided. The interface tool allows a user to submit unannotated image data requiring object localization through the framework provided herein (e.g., object bounding box generation identifying an object, as well as object class labels for classification). The interface tool further allows a user to see the results of object localization, provide feedback on the resulting bounding box generation, request processing using different object localization processes discussed herein, and receive the resulting annotated data used for neural network training.

For neural networks providing object detection (e.g., detecting instances of semantic objects of a certain class in images or videos), large amounts of annotated data are required to receive good object detection results. For example, tens of thousands or more annotated images having bounding box information of an object and classification may be required to identify an object. Moreover, for detection of multiple different types of objects, class labels, and other semantic items in images, billions of different annotated images showing those different semantic items may be requires. Thus, a customer of the CRM system must provide large amounts of manpower to manually label images. This introduces human error into the process of annotating data. Furthermore, a database system may require large amounts of resources to store different sets of image data. It is a difficult task to train neural networks. In a multi-tenant system, such as Salesforce.com, a customer may be required to utilize a large amount of resources to train a neural network for object detection. Continuing with the example, because the customer may be interest in quickly training a neural network without using valuable manpower and database resources, it may be desirable or preferable that the unannotated image data is annotated using an automated framework that requires no or minimal user input to generate bounding box information and other annotations in unlabeled or unannotated image data. As such, according to some embodiments, systems and methods are provided for generating annotated data for object detection neural networks.

Computer and Networked Environment

According to some embodiments, in a multi-tenant database system accessible by a plurality of separate and distinct organizations, such as system 116 shown and described with respect to FIGS. 1 and 2, a AI agent 330 is provided for encrypting and decrypting cryptographic signatures in a multi-tenant cloud-based environment such as environment 110. The AI agent 330 may be installed or implemented at a computing device shown in FIG. 3. In some embodiments, AI agent 330 is part of system 116.

Figure 5A:
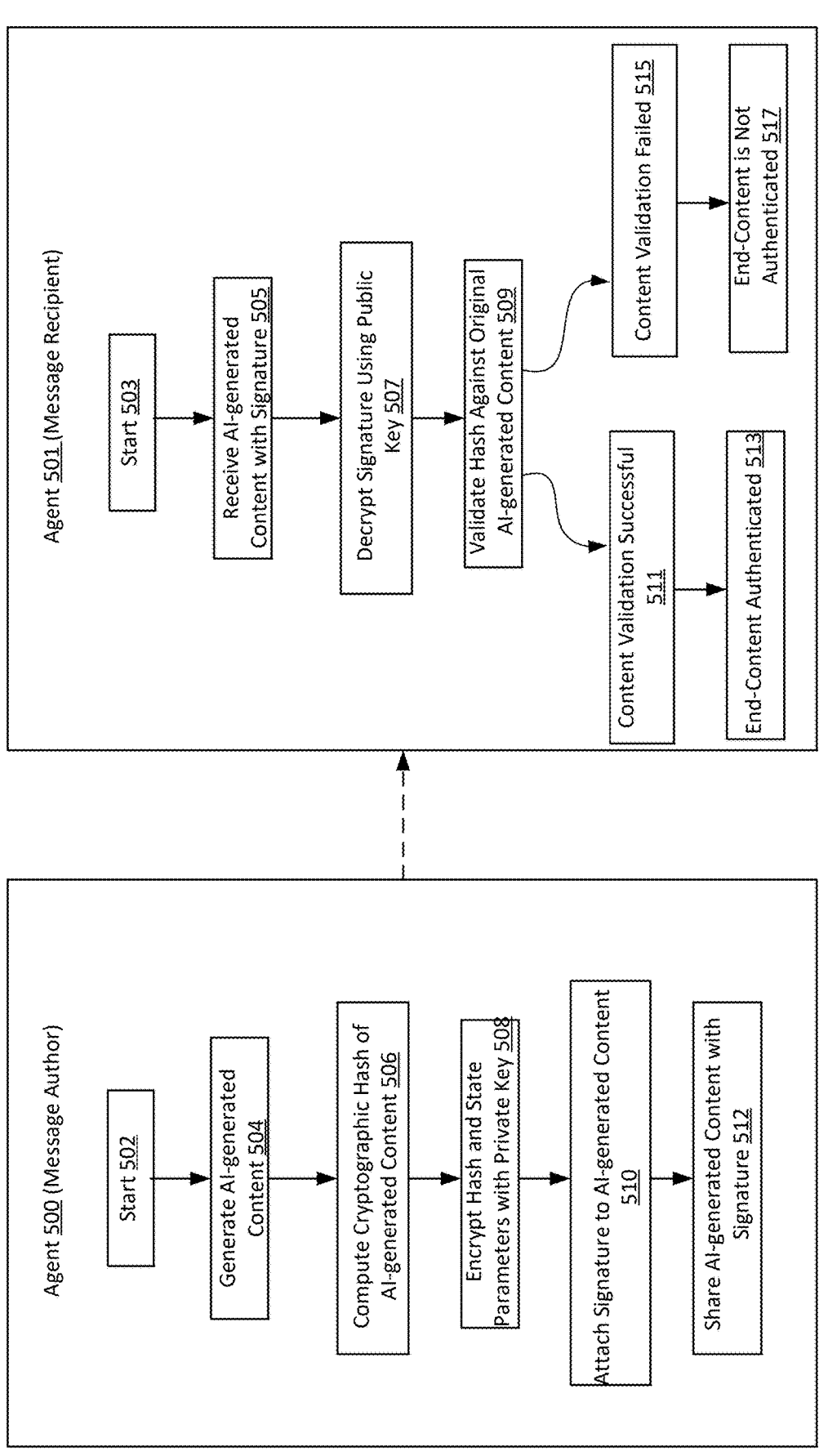
FIGS. 5A and 5B illustrate simplified block diagrams of a system for AI agents that generate cryptographic signature for AI-generated content, according to some embodiments.
Figure 5B:
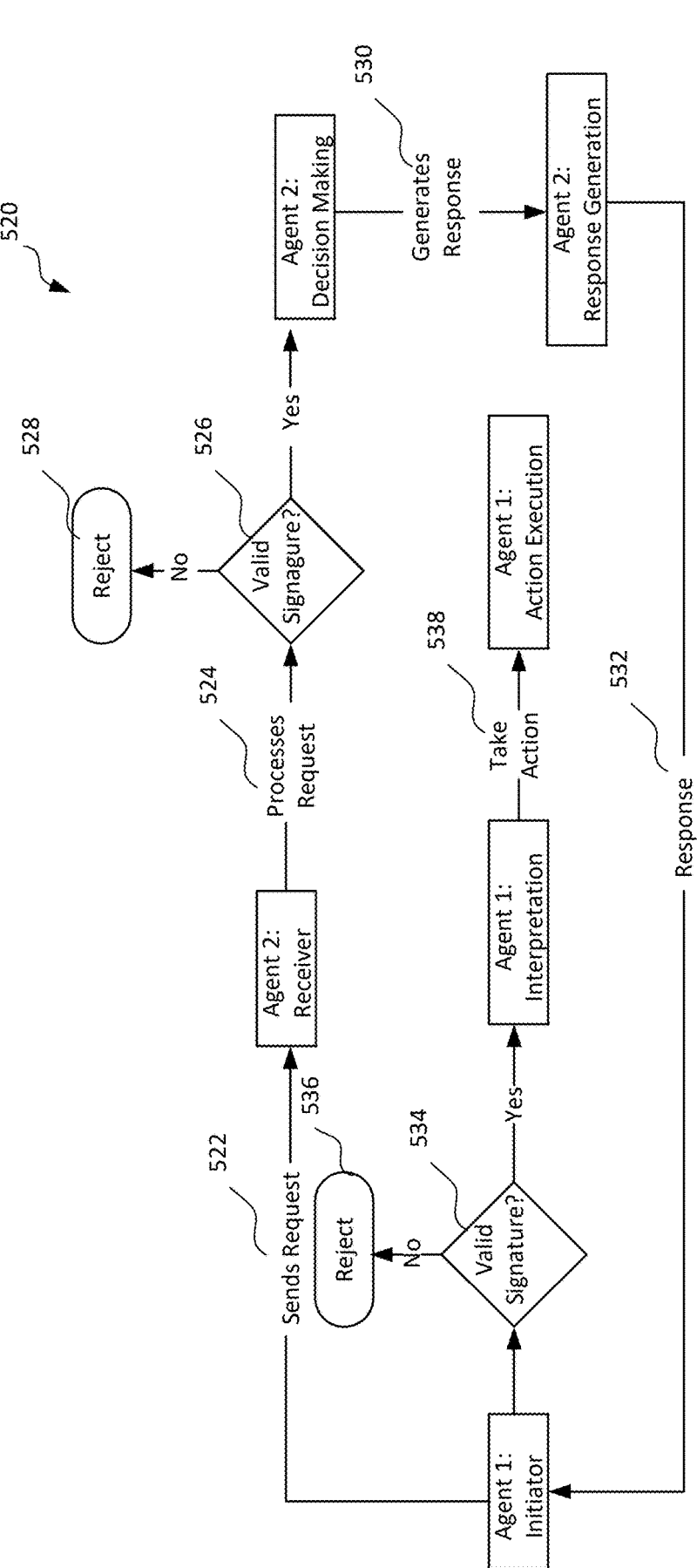
Figure 6:
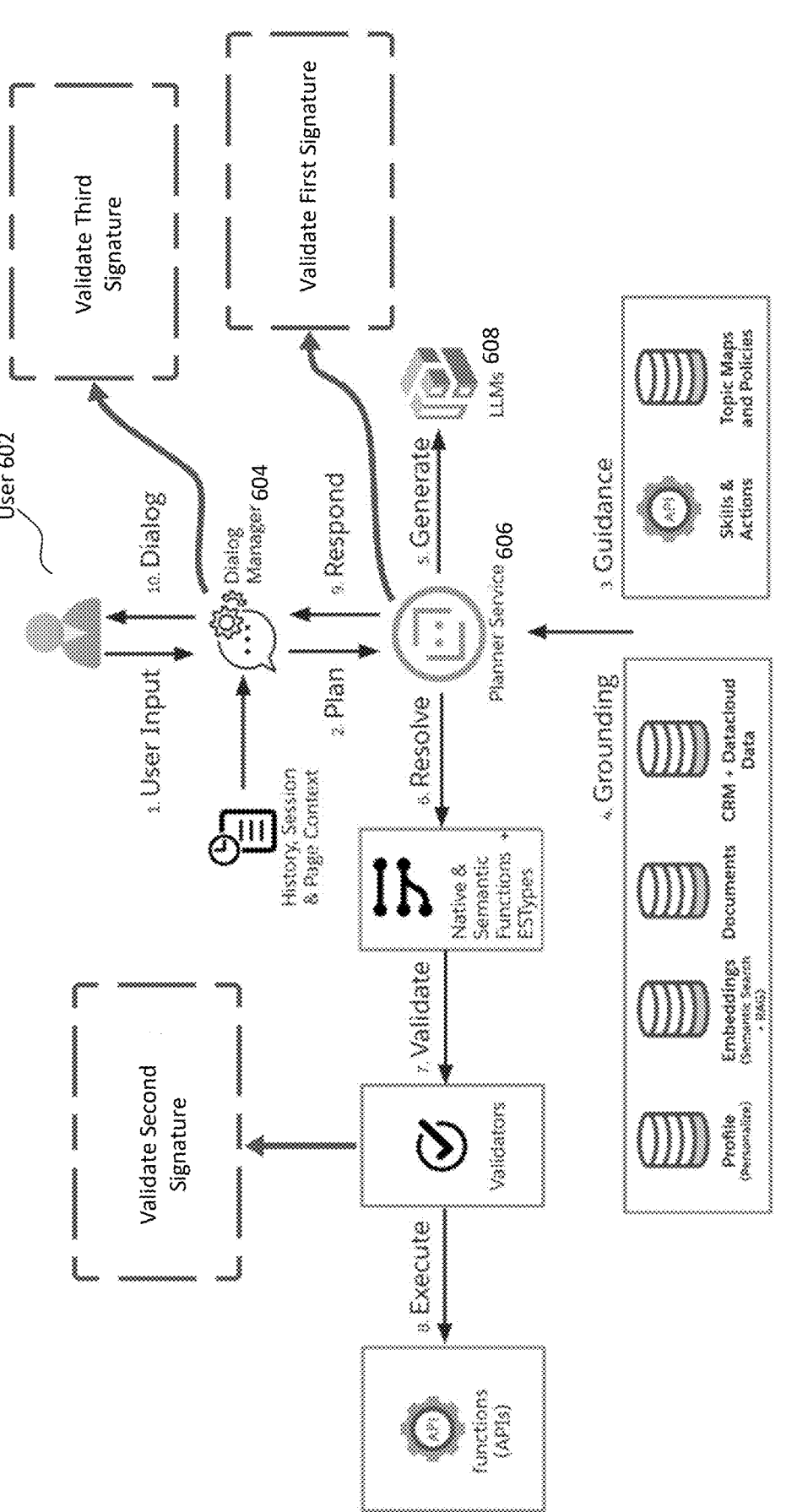
FIG. 6 illustrate another simplified block diagram of a system for AI agents that generate cryptographic signature for AI-generated content, according to some embodiments.

FIG. 3 is a simplified diagram illustrating a computing device implementing the cryptographic signature system described in FIGS. 5A, 5B, and 6, according to one embodiment described herein. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for AI agent 330 that may be used to implement and/or emulate the systems and models, and/or to implement any of the methods described further herein. AI agent 330 may receive input 340 such as an encrypted input including output content generated by a remote neural network model and corresponding cryptographic signature via the data interface 315 and generate an output 350 which may be an output content in response to the encrypted input.

The data interface 315 may comprise a communication interface, a user interface (such as a voice input interface, a graphical user interface, and/or the like). For example, the computing device 300 may receive the input 340 (such as an encrypted input) from a networked database via a communication interface. Or the computing device 300 may receive the input 340, such as any suitable input content (e.g., texts, images, audios, videos, or a combination thereof) with a respective cryptographic signature embedded within, from a user via the user interface.

In some embodiments, the AI agent 330 includes a neural network model (e.g., located at the same server or a remote server) and is configured to generate a cryptographic signature for the output content generated by the neural network model. AI agent 330 may generate the output based on input 340 (e.g., an encrypted input), which may include the output content generated by another neural network model located at a remote server and respective cryptographic signature. AI agent 330 may decrypt the encrypted input and generate the corresponding output or an alert based on the decryption result. The AI agent 330 may include a decryption submodule 331, a content validation & tracing submodule 332, a generative AI submodule 333, and an encryption submodule 334.

Decryption submodule 331 may be configured to receive an encrypted input, e.g., via data interface 315 as at least part of input 340, for computing device 300. The encrypted input may be generated by another agent located at a remote server, and may include content generated by another neural network model as part of the other agent or entered by a user (e.g., human). In various embodiments, the other neural network model can be located at the same remote server as the other agent or at a different server. In some embodiments, the encrypted input includes the output content of the other neural network model and a cryptographic signature embedded in the output content. In some embodiments, the cryptographic signature include a first string of Hash values generated from the output content of the other neural network model (e.g., using a suitable cryptographic Hash algorithm) and one or more state parameters of the other neural network model. The other agent may encrypt the Hash values and the state parameters using a private key to form the cryptographic signature associated with the other neural network model.

Decryption submodule 331 may also be configured to decrypt the cryptographic signature associated with the other neural network model. In some embodiments, decryption submodule 331 may decrypt cryptographic signature using a public key, such as Rivest-Shamir-Adleman (RSA) and/or Elliptic Curve Cryptography (ECC) through a suitable cryptographic algorithm. In some embodiments, the public key is paired to the private key used by the other agent.

Content validation & tracing submodule 332 may also encrypt the output content generated by the other neural network model using a public key corresponding to the private key the other agent uses to encrypt the first string of Hash values and the state parameters of the other neural network model, to generate a second string of Hash values (e.g., using a suitable cryptographic Hash algorithm). Content validation & tracing submodule 332 may compare the second string of Hash value and the first string of Hash value, and make decisions based on the comparison results. In some embodiments, if the first string of Hash values match the second string of Hash values, content validation & tracing submodule 332 determines the output content of the other neural network model is not tampered or has no error. Content validation & tracing submodule 332 may determine generative AI submodule 333, e.g., a neural network model being part of AI agent 330, can use the output content of the other neural network (e.g., the encrypted input) to generate respective output content. If the first string of Hash values do not match the second string of Hash values, content validation & tracing submodule 332 may reject the output content of the other neural network (e.g., the encrypted input) such that generative AI submodule 333 does not proceed to generate any output from the encrypted input. In some embodiments, content validation & tracing submodule 332 may generate an alert and transmit the alert to the other agent notifying about the tampering and/or error. In various embodiments, content validation & tracing submodule 332 may trace the other agent (or the other neural network model) based on the state parameters decrypted from the cryptographic signature.

Generative AI submodule 333 may use the output content of the other neural network (e.g., the encrypted input) to generate respective output content. Generative AI submodule 333 may include a neural network model located at the same server (e.g., stored in memory 320) and/or located in a remote server (e.g., accessed by other submodules of AI agent 330 via an application programming interface (API)). Generative AI submodule 333 may receive texts, images, audios, and/or videos as an input and outputs corresponding texts, images, audios, and/or videos. In some embodiments, generative AI submodule 333 includes a trained neural network model that is trained on a set of training data including texts, images, audios, and/or videos. Generative AI submodule 333 may include a plurality of state parameters that can be used in generating a cryptographic signature corresponding to its output, by encryption submodule 334. For example, generative AI submodule 333 may include one or more weights (and/or biases) of the neural network model, one or more hidden states of the neural network model that are updated when generating the output content, and/or identifying information of the neural network model (e.g., hyperparameters, architecture information, framework and version, metadata of the model, etc.) In some embodiments, other submodules 331, 332, and/or 334 of computing device 300 obtain the output content of the neural network model and access state parameters of the neural network model via the API. The detailed description of the neural network model of generative AI submodule 333 (e.g., architecture, training, etc.) is further provided in FIG. 3B.

Encryption submodule 334 may be configured to generate a cryptographic signature associated with the neural network model in/as generative AI submodule 333. Encryption submodule 334 may obtain the output content of the neural network model and generate a third string of Hash values using a suitable cryptographic Hash algorithm. Examples of the cryptographic Hash algorithms may include Secure Hash Algorithm 256-bit (SHA-256), SHA-3, and/or SHA-512. Concurrently or sequentially, encryption submodule 334 may obtain/access one or more state parameters of the neural network model such as one or more weights (and/or biases) of the neural network model, one or more hidden states of the neural network model that are updated when generating the output content, and/or identifying information of the neural network model (e.g., hyperparameters, architecture information, framework and version, metadata of the model, etc.). Encryption submodule 334 may then encrypt the one or more state parameters and the third string of Hash values using a private key and a suitable algorithm such as Rivest-Shamir-Adleman (RSA) and/or Elliptic Curve Cryptography (ECC), to generate a cryptographic signature associated with the neural network model. Encryption submodule 334 may embed the cryptographic signature in the output content of the neural network model. The output content embedded with the cryptographic signature can be recovered, e.g., by another agent, through decryption. Encryption submodule 334 may also transmit the output content embedded with the cryptographic signature in output 350 to a destination server (e.g., another agent located at a remote server or a user). In some embodiments, the other agent may recover/decrypt the cryptographic signature and validate the received content using similar ways as decryption submodule 331 and content validation & tracing submodule 332, and the detail description is not repeated herein.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3A:
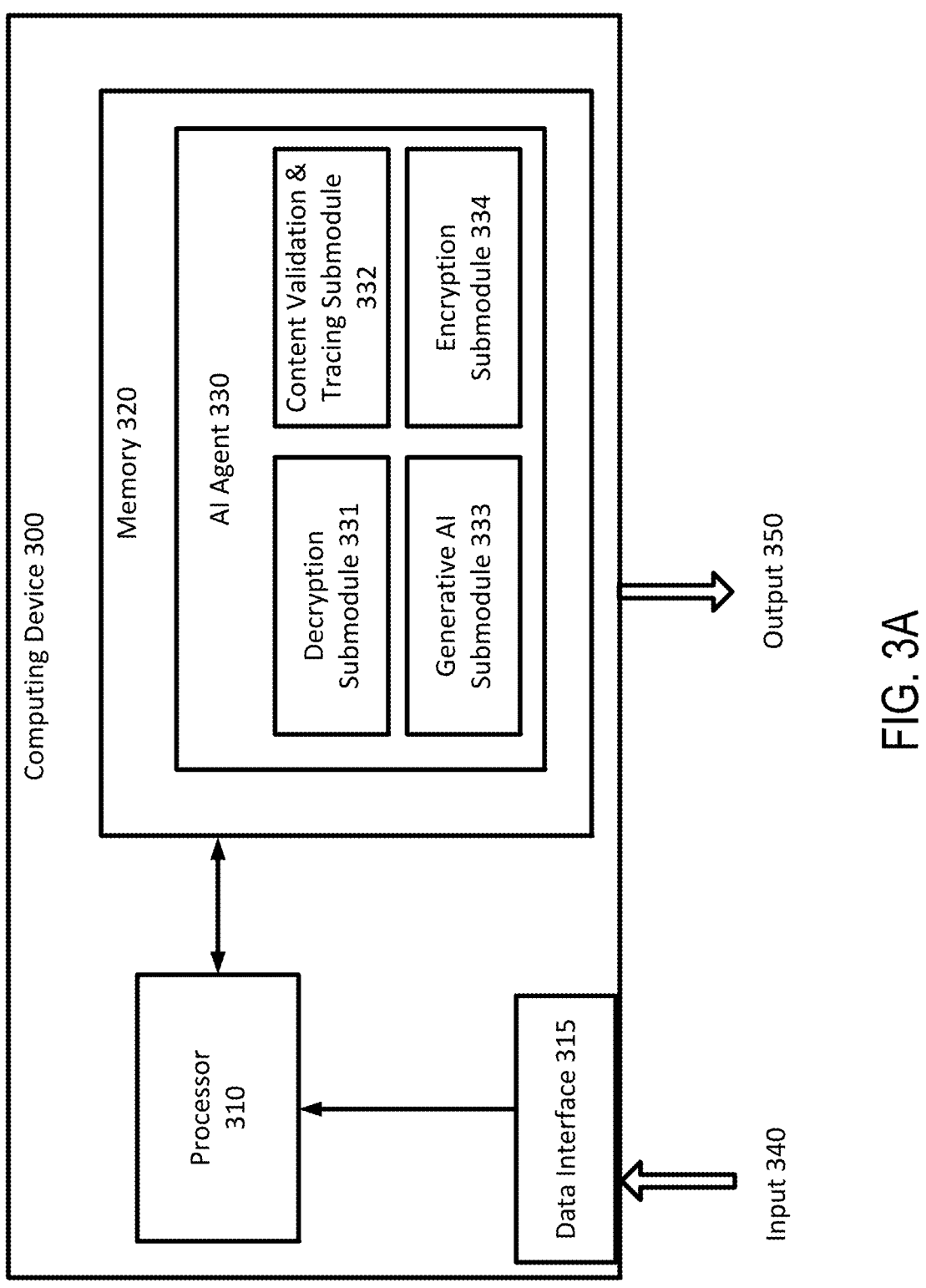
FIG. 3A is a simplified diagram of a computing device implementing an AI agent for generating cryptographic signature for AI-generated content, according to some embodiments.
Figure 3B:
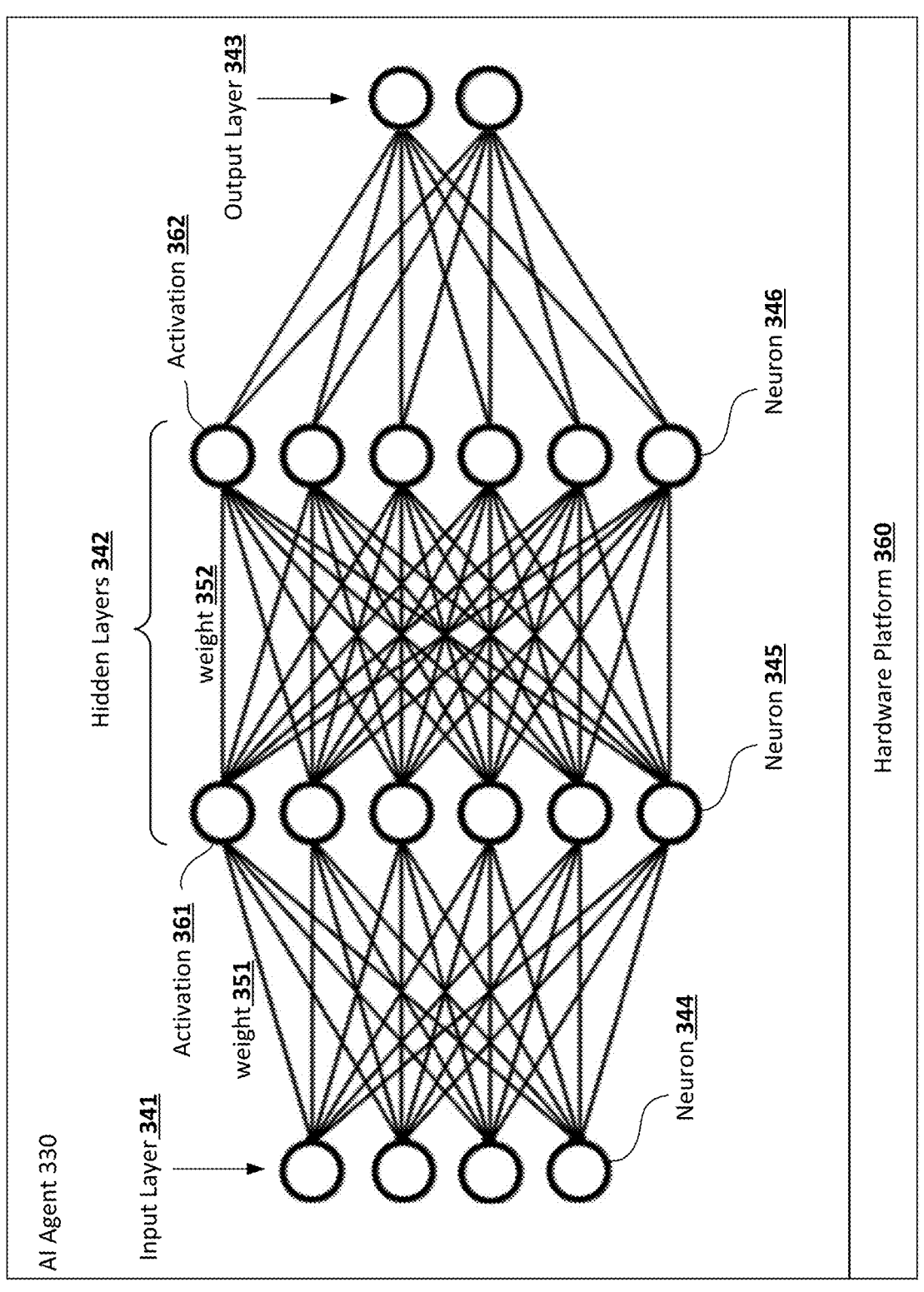
FIG. 3B is a simplified diagram illustrating a neural network structure used in an AI agent, according to some embodiments.

FIG. 3B is a simplified diagram illustrating the neural network structure implementing the AI agent 330 (e.g., generative AI submodule 333) described in FIG. 3A, according to some embodiments. In some embodiments, the AI agent 330 and/or one or more of its submodules 331-334 may be implemented at least partially via an artificial neural network structure shown in FIG. 3B. The neural network comprises a computing system that is built on a collection of connected units or nodes, referred to as neurons (e.g., 344, 345, 346). Neurons are often connected by edges, and an adjustable weight (e.g., 351, 352) is often associated with the edge. The neurons are often aggregated into layers such that different layers may perform different transformations on the respective input and output transformed input data onto the next layer.

For example, the neural network architecture may comprise an input layer 341, one or more hidden layers 342 and an output layer 343. Each layer may comprise a plurality of neurons, and neurons between layers are interconnected according to a specific topology of the neural network topology. The input layer 341 receives the input data (e.g., 340 in FIG. 3A), such as output content (e.g., the original output content obtained from decryption or the decrypted input in input 340) from another neural network model. The number of nodes (neurons) in the input layer 341 may be determined by the dimensionality of the input data (e.g., the length of a vector of give an example of the input). Each node in the input layer represents a feature or attribute of the input.

The hidden layers 342 are intermediate layers between the input and output layers of a neural network. It is noted that two hidden layers 342 are shown in FIG. 3B for illustrative purpose only, and any number of hidden layers may be utilized in a neural network structure. Hidden layers 342 may extract and transform the input data through a series of weighted computations and activation functions.

For example, as discussed in FIG. 3A, the AI agent 330 receives an input 340 of output content generated by another neural network model and transforms the input into an output 350 such as texts, images, audios, and/or videos. To perform the transformation, each neuron receives input signals, performs a weighted sum of the inputs according to weights assigned to each connection (e.g., 351, 352), and then applies an activation function (e.g., 361, 362, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 341 is transformed into rather different values indicative data characteristics corresponding to a task that the neural network structure has been designed to perform.

The output layer 343 is the final layer of the neural network structure. It produces the network's output or prediction based on the computations performed in the preceding layers (e.g., 341, 342). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the AI agent 330 and/or one or more of its submodules 331-334 may comprise the transformative neural network structure of layers of neurons, and weights and activation functions describing the non-linear transformation at each neuron. Such a neural network structure is often implemented on one or more hardware processors 310, such as a graphics processing unit (GPU). An example neural network may be ChatGPT, GPT-4, and/or the like.

In one embodiment, the AI agent 330 and its submodules 331-334 may be implemented by hardware, software and/or a combination thereof. For example, the AI agent 330 and its submodules 331-334 may comprise a specific neural network structure implemented and run on various hardware platforms 360, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 360 used to implement the neural network structure is specifically configured based on factors such as the complexity of the neural network, the scale of the tasks (e.g., training time, input data scale, size of training dataset, etc.), and the desired performance.

In one embodiment, the neural network based AI agent 330 and one or more of its submodules 331-334 may be trained by iteratively updating the underlying parameters (e.g., weights 351, 352, etc., bias parameters and/or coefficients in the activation functions 361, 362 associated with neurons) of the neural network based on a loss. For example, during forward propagation, the training data such as texts, images, audios, and/or videos, are fed into the neural network. The data flows through the network's layers 341, 342, with each layer performing computations based on its weights, biases, and activation functions until the output layer 343 produces the network's output 350. In some embodiments, output layer 343 produces an intermediate output on which the network's output 350 is based.

The output generated by the output layer 343 is compared to the expected output (e.g., a "ground-truth" such as the corresponding give an example of ground truth label) from the training data, to compute a loss function that measures the discrepancy between the predicted output and the expected output. For example, the loss function may be a cross entropy loss, a minimum mean squared error (MMSE) loss, and/or a contrastive loss, etc. Given the loss, the negative gradient of the loss function is computed with respect to each weight of each layer individually. Such negative gradient is computed one layer at a time, iteratively backward from the last layer 343 to the input layer 341 of the neural network. These gradients quantify the sensitivity of the network's output to changes in the parameters. The chain rule of calculus is applied to efficiently calculate these gradients by propagating the gradients backward from the output layer 343 to the input layer 341.

Parameters of the neural network are updated backwardly from the last layer to the input layer (backpropagating) based on the computed negative gradient using an optimization algorithm to minimize the loss. The backpropagation from the last layer 343 to the input layer 341 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as generating texts, images, audios, and/or videos.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in model-model communication.

Figure 4:
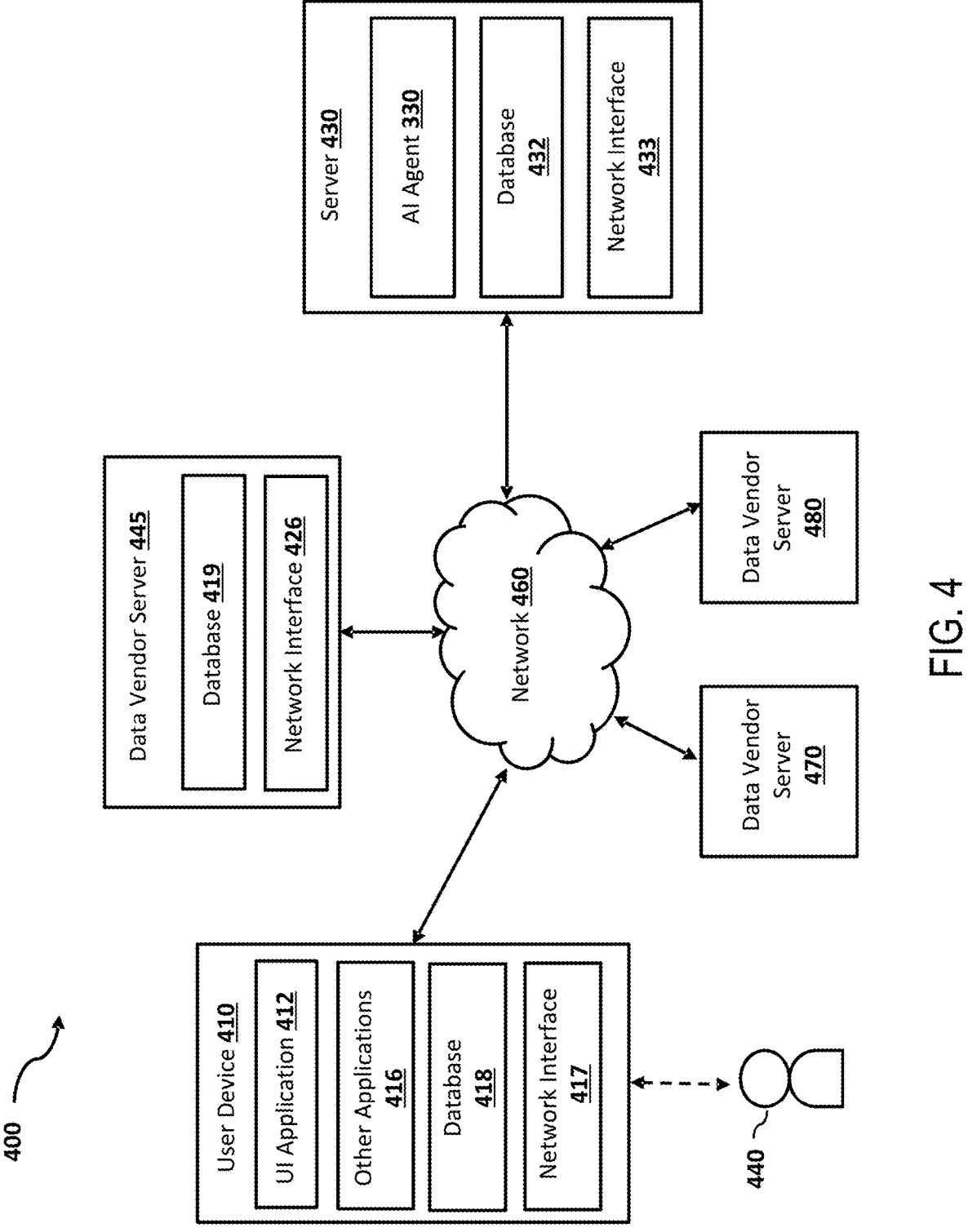
FIG. 4 is a simplified block diagram of a networked system suitable for implementing the system for an AI agent that generates cryptographic signature for AI-generated content, described in FIGS. 5A, 5B, and 6, and other embodiments described herein.

FIG. 4 is a simplified block diagram of a networked system 400 suitable for implementing the cryptographic signature system described in FIGS. 3, 5A, 5B, and 6, and other embodiments described herein. In one embodiment, system 400 includes the user device 410 which may be operated by user 440, data vendor servers 445, 470 and 480, server 430, and other forms of devices, servers, and/or software components that operate to perform various methodologies in accordance with the described embodiments. Exemplary devices and servers may include device, standalone, and enterprise-class servers which may be similar to the computing device 300 described in FIG. 3, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 410, data vendor servers 445, 470 and 480, and the server 430 may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message indicating an output content from a neural network model from the server 430 and display the message via the UI application 412. In other embodiments, user device 410 may include additional or different modules having specialized hardware and/or software as required.

In various embodiments, user device 410 includes other applications 416 as may be desired in particular embodiments to provide features to user device 410. For example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a prediction result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view the output content of a neural network device.

User device 410 may further include database 418 stored in a transitory and/or non-transitory memory of user device 410, which may store various applications and data and be utilized during execution of various modules of user device 410. Database 418 may store user profile relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 417 adapted to communicate with data vendor server 445 and/or the server 430. In various embodiments, network interface component 417 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts database 419 to provide training datasets including various text, images, audios, videos, etc., to the server 430. The database 419 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 419, via the network interface 426, to the server 430.

In one embodiment, multiple servers 430 may be communicatively coupled through the network 460. For example, each server 430 may host an AI agent 330 which communicates with each other through a secured communication channel for encrypted AI-generated content.

The server 430 may be housed with the AI agent 330 and its submodules described in FIG. 3. In some implementations, AI agent 330 may receive data from database 419 at the data vendor server 445 via the network 460 to generate corresponding output content. The generated output content (e.g., embedded with a cryptographic signature) may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the AI agent 330. In one implementation, the database 432 may store previously generated output content such as text, images, audios, video, etc., and the corresponding input feature vectors. In another implementation, the database 432 may store one or more public-private key pairs, such as one public key pairing with more than one private keys.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

FIG. 5A illustrates an example of secured communication between two AI agents, e.g., in a multi-tenant cloud-based computing environment, such as environment 110, according to some embodiments. The communication may employ the use of cryptographic signature. In some embodiments, agents 500 and 501 are each an example of AI agent 330.

As shown in FIG. 5A, an agent 500 (e.g., a sender agent or a message author) may initialize to start (step 502) communicating with an agent 501 (e.g., a message recipient). Agent 500 may generate AI-generated content (step 504), and may compute cryptographic Hash of the content (step 506). In some embodiments, the AI-generated content includes the output content generated by a first neural network model as part of agent 500, and cryptographic Hash may include a string of Hash values generated using a suitable algorithm. Agent 500 may then encrypt the Hash values and one or more parameters of the first neural network model with a private key (step 508) to generate a cryptographic signature, and attach/embed the cryptographic signature into the AI-generated content (step 510). For example, the parameters of the neural network may include any identifying information of the neural network, hidden states of the neural network when generating the AI-generated content, and/or the like. Agent 500 may then share/send the AI-generated content embedded with the cryptographic signature 512 to agent 501, as indicated by the dashed line between agent 500 and agent 501.

Agent 501 (e.g., a recipient agent or a message recipient) may initialize to start (step 503) communicating with agent 500. Agent 501 may receive the AI-generated content embedded with the cryptographic signature (step 505), and may decrypt the cryptographic signature using a public key (at step 507). Agent 501 may obtain the string of Hash values generated by agent 500 and the state parameters of the first neural network model through decryption. Agent 501 may validate the AI-generated content by validating the decrypted Hash values (at step 509). Agent 501 may generate another string of Hash values from the received AI-generated content (e.g., the original AL-generated content), and compare the decrypted string of Hash values with the generated string of Hash values. If the decrypted string of Hash values match the generated string of Hash values, agent 501 may determine the content validation is successful (at step 511) and end-content is authenticated (at step 513). In some embodiments, agent 501 uses the authenticated output from agent 500 as the input to generate respective output content using a second neural network model (e.g., after step 513). In some embodiments, agent 501 may perform similar or the same operations as 500 to generate and transmit a cryptographic signature. If the decrypted string of Hash values does not match the generated string of Hash values, agent 501 may determine the content validation failed (at step 515) and end-content is not authenticated (at step 517). In some embodiments, agent 501 sends an alert to agent 500 regarding the failed authentication (e.g., after step 517), notifying agent 500 the AI-generated content may contain error, be tampered, and/or corrupted. In some embodiments, agent 501 may trace agent 500 using the state parameters decrypted from the cryptographic signature.

Although not shown, in some embodiments, more than one agents may communicate with a same agent. For example, more than one agent 500 may transmit respective AI-generated content with cryptographic signature to agent 501 simultaneously or sequentially. Agent 501 may respectively trace back the agents 500 which transmits unauthenticated AI-generated content using their respective state parameters.

FIG. 5B illustrates another example of communication between two agents, e.g., in a multi-tenant cloud-based computing environment, such as environment 110, according to some embodiments. The communication may employ the use of cryptographic signature. In some embodiments, agents 1 and 2 are each an example of AI agent 330.

As shown in FIG. 5B, agent 1 may be the initiator. Agent 1 may generate and send a request (at step 522) to agent 2 (a receiver). In some embodiments, the request may include (e.g., be embedded with) a cryptographic signature associated with agent 1 (or the neural network model of agent 1). Agent 2 may process the request (at step 524) and decrypt the cryptographic signature to obtain a string of Hash values and one or more state parameters associated with agent 1 (e.g., the state parameters of the neural network model in agent 1). Agent 2 may determine whether the cryptographic signature is a valid signature (at step 526). For example, agent 2 may encrypt the content of the request (e.g., the original request) to obtain another string of Hash values and compare it with the string of Hash values obtained from decryption. If the two strings of Hash values match, agent 2 may determine the request is authenticated and start decision making based on the request. If the two strings of Hash values don't match, agent 2 may reject the request (at step 528).

Agent 2 may then generate response (at step 530), using the respective neural network model, if the two strings of Hash values match, and may send the response to agent 1 (at step 532). The response may include (e.g., be embedded with) a cryptographic signature associated with agent 2 (or the neural network model of agent 2). Agent 1 may process the response and decrypt the cryptographic signature to obtain a string of Hash values and one or more state parameters associated with agent 2. Agent 1 may determine whether the cryptographic signature is a valid signature (at step 534). For example, agent 1 may encrypt the content of the response to obtain another string of Hash values and compare it with the string of Hash values obtained from decryption. If the two strings of Hash values match, agent 1 may determine the response is authenticated and make interpretation based on the response. If the two strings of Hash values don't match, agent 1 may reject the response (at step 536). Agent 1 may take action based on the response (at step 538), and may perform action execution using the respective neural network model, if the two strings of Hash values match.

FIG. 6 illustrates a use case of secured communication using the AI content validation mechanism described in FIGS. 1-5, involving a user, a computer, and a language model, e.g., in a multi-tenant cloud-based computing environment such as environment 110, according to some embodiments.

As shown in FIG. 6, at step 1, a user 602 input may be entered into a dialog manager 604 application implemented any suitable electronic device (e.g., computing device 300 in FIG. 3A, user device 410 in FIG. 4). For example, the dialog manager 604 may include a computer or a mobile phone. The user input can include any suitable input such as texts, images, audios, and/or videos. The dialog manager 604 may incorporate history, session, and page context into the user input 1. At step 2, the dialog manager may generate a plan for the user input based on user input, and send plan to a planner service 606, which may be located in a remote server. In some embodiments, the dialog manager 604 may embed a first cryptographic signature in the plan. The planner service 606 may validate the first signature. When the planner service 606 determines the first signature is authenticated, the planner service may access guidance 3 at step 3 and access grounding information at step 4, for the plan. At step 5, planner service 606 may use the collected information along with the plan to generate a prompt for one or more LLMs 608, which are communicatively coupled to the planner service, e.g., via API's. At step 6, the LLMs 608 may then generate an output that the planner service 606 uses to resolve the plan. In some embodiments, the LLMs 608 belong to one or more agents (e.g., similar to AI agent 330), and the output content may include respective second cryptographic signatures each associated with a respective LLM.

At step 7, the planner service 606 may analyze the output content of the LLMs using native & semantic functions, and may validate the second cryptographic signatures. At step 8, if the second signatures are validated, the planner service 606 may execute the output content, e.g., using one or more neural network models through functions (API's). At step 9, the planner service 606 may then embed a third cryptographic signature in the execution result and respond to the dialog manager 604, which validates the third cryptographic signature. At step 10, if the third cryptographic signature is determined to be authenticated, the dialog manager 604 may send a dialog to the user 602 showing the execution result.

FIG. 7 is an example logic flow diagram illustrating a method of employing cryptographic signature in agent-to-agent communication based on the framework shown in FIGS. 3, 4, 5A, 5B, and 6, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the AI agent 330 (e.g., FIGS. 3, 4, 5A, 5B, and 6) that performs generating and transmitting a cryptographic signature based on AI-generated content.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 702, an output content is generated by a neural network model that employs a plurality of parameters and implemented on one or more processors.

In some embodiments, the one or more state parameters of the neural network model include one or more of one or more weights of the neural network model (e.g., as described in relation to FIG. 3B), one or more hidden states of the neural network model that are updated when generating the output content, or identifying information of the neural network model. In some embodiments, the generating, by the neural network model, the output content includes accessing the neural network model located at a remote server via an API and receiving the output content from the remote server via the API. In some embodiments, the output content is generated based on an encrypted input that is generated by another neural network model at a remote server. In some embodiments, the output content as generated by the neural network model is recoverable from the output content embedded with the cryptographic signature through decryption.

At step 704, a string of Hash values is generated based on the output content.

At step 706, a cryptographic signature is created by encrypting the string of Hash values and one or more state parameters of the neural network model using a private key.

At step 708, the cryptographic signature is embedded in the output content.

At step 710, the output content embedded with the cryptographic signature is transmitted, via a communication interface, to a destination server.

In some embodiments, the method further includes decrypting the encrypted input using a public key to obtain a second string of Hash values, recovering a second cryptographic signature from a decrypted input, and generating a third string of Hash values of a second output content from the decrypted input. The method may further include comparing the second string of Hash values and the third string of Hash values; in response to the string of Hash values matching the other string of Hash values, accepting the second output content and transmitting the output content to the destination server. In response to the second string of Hash values being different from the third string of Hash values, the second output content is rejected.

In some embodiments, the method further includes, in response to determining that the second string of Hash values being different from the third string of Hash values, identifying the other neural network model that generates the encrypted input based on a recovered cryptographic signature; and transmitting an alert to the other neural network model notifying the other neural network model about the discrepancy. In some embodiments, the method further includes identifying one or more other neural network models, situated at a multi-tenant cloud-based environment, that contribute to the encrypted input, based on the recovered cryptographic signature.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for multi-agent communication using a cryptographic signature, comprising:

receiving, by a first neural network model employing a plurality of state parameters and implemented on one or more processors, a first output content generated by a second neural network model;

generating, by the first neural network model, a second output content in response to the first output content as an input of the first neural network model;

generating, by the first neural network model, a string of Hash values based on the second output content;

creating, by the first neural network model, a cryptographic signature by encrypting the string of Hash values and one or more state parameters of the first neural network model using a private key;

embedding, by the first neural network model, the cryptographic signature in the second output content; and transmitting, by the first neural network model via a communication interface, the second output content embedded with the cryptographic signature to the second neural network model at a destination server.

2. The method of claim 1, wherein the one or more state parameters of the first neural network model comprises one or more of:

one or more weights of the first neural network model;

one or more hidden states of the first neural network model that are updated when generating the output content; or identifying information of the first neural network model.

3. The method of claim 1, wherein the generating, by the first neural network model, the second output content comprises:

accessing the second neural network model located at the destination server via an application programming interface (API); and receiving the first output content from the remote server via the API.

4. The method of claim 1, wherein the second output content is generated based on an encrypted input that is generated by the second neural network model.

5. The method of claim 4, further comprising:

decrypting the encrypted input using a public key to recover a second cryptographic signature;

obtaining a second string of Hash values from the recovered second cryptographic signature;

generating a third string of Hash values based on a received first output content that embeds the second cryptographic signature;

comparing the second string of Hash values and the third string of Hash values;

in response to the second string of Hash values matching the third string of Hash values, accepting the received first output content and transmitting the second output content to the destination server; and in response to the second string of Hash values being different from the third string of Hash values, rejecting the second output content.

6. The method of claim 5, further comprising:

in response to determining that the second string of Hash values being different from the third string of Hash values, identifying the other neural network model that generates the encrypted input based on the recovered second cryptographic signature based on the plurality of state parameters; and transmitting an alert to the second neural network model notifying the second neural network model about a failed authentication.

7. The method of claim 5, further comprising:

identifying one or more other neural network models, situated at a multi-tenant cloud-based environment, that contribute to the encrypted input, based on the recovered cryptographic signature.

8. The method of claim 1, wherein the first output content as generated by the second neural network model is recoverable from a received first output content embedded with the cryptographic signature through decryption.

9. A system for multi-agent communication using a cryptographic signature, the system comprising:

a memory that stores a first neural network model and a plurality of processor executable instructions;

a communication interface that receives an input for the first neural network model; and one or more hardware processors that read and execute the plurality of processor-executable instructions from the memory to perform operations comprising:

receiving, by the first neural network model employing a plurality of state parameters and implemented on one or more processors, a first output content generated by a second neural network model;

generating, by the first neural network model, a second output content in response to the first output content as an input of the first neural network model;

generating, by the first neural network model, a string of Hash values based on the second output content;

creating, by the first neural network model, a cryptographic signature by encrypting the string of Hash values and one or more state parameters of the first neural network model using a private key;

embedding, by the first neural network model, the cryptographic signature in the second output content; and transmitting, by the first neural network model via a communication interface, the second output content embedded with the cryptographic signature to the second neural network model at a destination server.

10. The system of claim 9, wherein the one or more state parameters of the first neural network model comprises one or more of:

one or more weights of the first neural network model;

one or more hidden states of the first neural network model that are updated when generating the output content; or identifying information of the first neural network model.

11. The system of claim 9, wherein the generating, by the first neural network model, the second output content comprises:

accessing the second neural network model located at the destination server via an application programming interface (API); and receiving the first output content from the remote server via the API.

12. The system of claim 9, wherein the second output content is generated based on an encrypted input that is generated by the second neural network model.

13. The system of claim 12, wherein the operations further comprise:

decrypting the encrypted input using a public key to recover a second cryptographic signature;

obtaining a second string of Hash values from the recovered second cryptographic signature;

generating a third string of Hash values based on a received first output content that embeds the second cryptographic signature;

comparing the second string of Hash values and the third string of Hash values;

in response to the second string of Hash values matching the third string of Hash values, accepting the received first output content and transmitting the second output content to the destination server; and in response to the second string of Hash values being different from the third string of Hash values, rejecting the second output content.

14. The system of claim 13, wherein the operations further comprise:

in response to determining that the second string of Hash values being different from the third string of Hash values, identifying the other neural network model that generates the encrypted input based on the recovered second cryptographic signature based on the plurality of state parameters; and transmitting an alert to the second neural network model notifying the second neural network model about a failed authentication.

15. The system of claim 14, wherein the operations further comprise:

identifying one or more other neural network models, situated at a multi-tenant cloud-based environment, that contribute to the encrypted input, based on the recovered cryptographic signature.

16. The system of claim 9, wherein the first output content as generated by the second neural network model is recoverable from a received first output content embedded with the cryptographic signature through decryption.

17. A non-transitory machine-readable medium comprising a plurality of machine-executable instructions for encrypted multi-agent communication which, when executed by one or more processors, are adapted to cause the one or more processors to perform operations comprising:

receiving, by a first neural network model employing a plurality of state parameters and implemented on one or more processors, a first output content generated by a second neural network model;

generating, by the first neural network model, a second output content in response to the first output content as an input of the first neural network model;

generating, by the first neural network model, a string of Hash values based on the second output content;

creating, by the first neural network model, a cryptographic signature by encrypting the string of Hash values and one or more state parameters of the first neural network model using a private key;

embedding, by the first neural network model, the cryptographic signature in the second output content; and transmitting, by the first neural network model via a communication interface, the second output content embedded with the cryptographic signature to the second neural network model at a destination server.

18. The non-transitory machine-readable medium of claim 17, wherein the one or more state parameters of the first neural network model comprises one or more of:

one or more weights of the first neural network model;

one or more hidden states of the first neural network model that are updated when generating the output content; or identifying information of the first neural network model.

19. The non-transitory machine-readable medium of claim 17, wherein the generating, by the neural network model, the output content comprises:

accessing the second neural network model located at the destination server via an application programming interface (API); and receiving the first output content from the remote server via the API.

20. The non-transitory machine-readable medium of claim 17, wherein the second output content is generated based on an encrypted input that is generated by the second neural network model.

\* \* \* \* \*